US012640817B2

(12) United States Patent
Bei et al.

(10) Patent No.: US 12,640,817 B2
(45) Date of Patent: May 26, 2026

(54) COHERENT DETECTION METHOD, APPARATUS, AND SYSTEM

(71) Applicant: ZTE CORPORATION, Shenzhen (CN)

(72) Inventors: Jingsong Bei, Shenzhen (CN); Zhengxuan Li, Shenzhen (CN); Yiming Zhong, Shenzhen (CN); Bo Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 235 days.

(21) Appl. No.: 18/546,886

(22) PCT Filed: Dec. 8, 2021

(86) PCT No.: PCT/CN2021/136544
§ 371 (c)(1),
(2) Date: Aug. 17, 2023

(87) PCT Pub. No.: WO2022/174656
PCT Pub. Date: Aug. 25, 2022

(65) Prior Publication Data
US 2024/0187106 A1 Jun. 6, 2024

(30) Foreign Application Priority Data
Feb. 18, 2021 (CN) .......................... 202110187937.4

(51) Int. Cl.
*H04B 10/60* (2013.01)
*H04B 10/61* (2013.01)
(Continued)

(52) U.S. Cl.
CPC ..... *H04B 10/6163* (2013.01); *H04B 10/6165* (2013.01); *H04B 10/524* (2013.01); (Continued)

(58) Field of Classification Search
CPC ............ H04B 10/6163; H04B 10/6165; H04B 10/614; H04B 10/615; H04B 10/6151; (Continued)

(56) References Cited

U.S. PATENT DOCUMENTS

| | | | | |
|---|---|---|---|---|
| 6,512,619 | B1 * | 1/2003 | Fuse | H04B 10/548 |
| | | | | 359/278 |
| 7,027,743 | B1 * | 4/2006 | Tucker | H04B 10/64 |
| | | | | 356/484 |

(Continued)

FOREIGN PATENT DOCUMENTS

| | | |
|---|---|---|
| CN | 105530054 A | 4/2016 |
| EP | 3826202 B1 | 5/2021 |
| JP | S6451734 A | 2/1989 |

OTHER PUBLICATIONS

International Searching Authority. International Search Report and Written Opinion for PCT Application No. PCT/CN2021/136544 and English translation, mailed Feb. 24, 2022, pp. 1-12.

(Continued)

*Primary Examiner* — Dibson J Sanchez
(74) *Attorney, Agent, or Firm* — Vivacqua Crane, PLLC

(57) ABSTRACT

A coherent detection method, apparatus, and system are disclosed. The method may include: receiving an intensity-modulated optical signal transmitted by a transmitting end, where the intensity-modulated optical signal is obtained by intensity modulation performed by the transmitting end on an original signal; performing phase modulation on a local oscillator optical signal to obtain a phase-modulated local oscillator optical signal; and mixing the intensity-modulated optical signal and the phase-modulated local oscillator optical signal, and then performing photoelectric detection, analog-to-digital conversion, and digital signal receiving processing in sequence to recover the original signal.

16 Claims, 7 Drawing Sheets

(51) Int. Cl.

| | |
|---|---|
| *H04B 10/524* | (2013.01) |
| *H04B 10/54* | (2013.01) |
| *H04B 10/63* | (2013.01) |

(52) U.S. Cl.

CPC .............. *H04B 10/54* (2013.01); *H04B 10/60* (2013.01); *H04B 10/61* (2013.01); *H04B 10/63* (2013.01)

(58) Field of Classification Search

CPC .... H04B 10/616; H04B 10/613; H04B 10/61; H04B 10/54; H04B 10/5561; H04B 10/524; H04B 10/60; H04B 10/63

USPC .................................. 398/182–201, 202–214

See application file for complete search history.

(56) References Cited

U.S. PATENT DOCUMENTS

| | | | | |
|---|---|---|---|---|
| 7,941,059 | B1 * | 5/2011 | Hayes .................... | H04B 10/60 398/209 |
| 2003/0194240 | A1 * | 10/2003 | Mollenauer ...... | H04B 10/25133 398/155 |
| 2004/0208643 | A1 * | 10/2004 | Roberts ................. | H04B 10/63 398/186 |
| 2005/0012934 | A1 * | 1/2005 | Szafraniec ......... | H04B 10/0795 356/484 |
| 2008/0031637 | A1 * | 2/2008 | Tomaru ............... | H04B 10/548 398/188 |
| 2008/0056727 | A1 * | 3/2008 | Nishihara .......... | H04B 10/5165 398/155 |
| 2009/0047030 | A1 | 2/2009 | Hoshida | |
| 2012/0057863 | A1 * | 3/2012 | Winzer .................. | H04B 10/60 398/1 |
| 2014/0050233 | A1 * | 2/2014 | Yu ........................ | H04B 10/614 370/542 |
| 2014/0328592 | A1 * | 11/2014 | Zhou ...................... | H04B 10/61 398/208 |
| 2017/0250776 | A1 | 8/2017 | Morsy-Osman et al. | |
| 2018/0145767 | A1 * | 5/2018 | Fang ................ | H04B 10/25891 |
| 2020/0153513 | A1 * | 5/2020 | Gupta ............... | H04B 10/6165 |
| 2021/0135762 | A1 * | 5/2021 | Zhou ................... | H04B 10/615 |

OTHER PUBLICATIONS

Li, Y., et al. "Coherent Detection System Based on Phase-Modulated Local Oscillator," Acta Optica Sinica, vol. 41, No. 20, 2021.

Chang, S., et al. "Compensation of front-end IQ-mismatch in coherent optical receiver," Optical Fiber Technology, vol. 17, No. 2, 2011, pp. 124-127.

European Patent Office. Extended European Search Report for EP Application No. 21926370.4, mailed Jul. 12, 2024, pp. 1-12.

Hossain, M., et al. "An efficient scheme for receiver-side quadrature imbalance compensation in coherent optical receivers," IEEE International Conference on Fiber Optics and Photonics, 2012, pp. 1-3.

Painchaud, Y., et al. "Performance of balanced detection in a coherent receiver," Optics Express, vol. 17, No. 5, Mar. 2009, pp. 3659-3672.

* cited by examiner

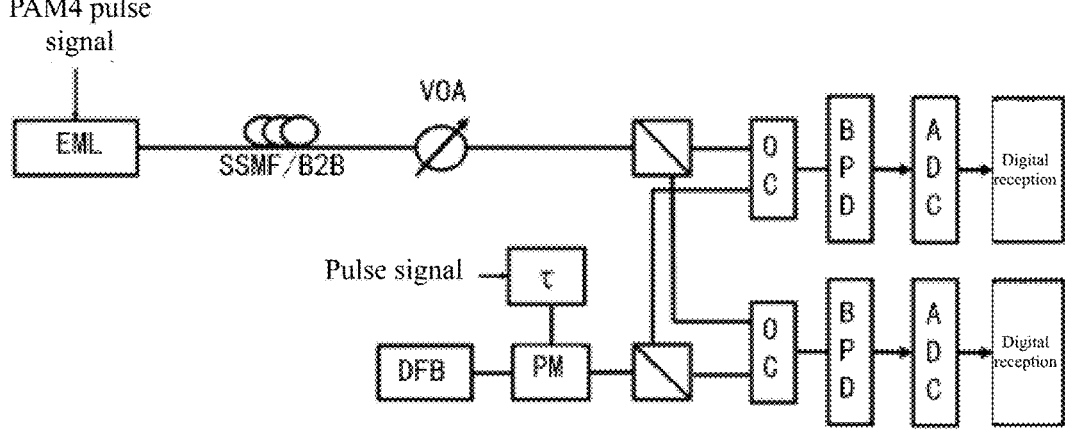
FIG. 5b
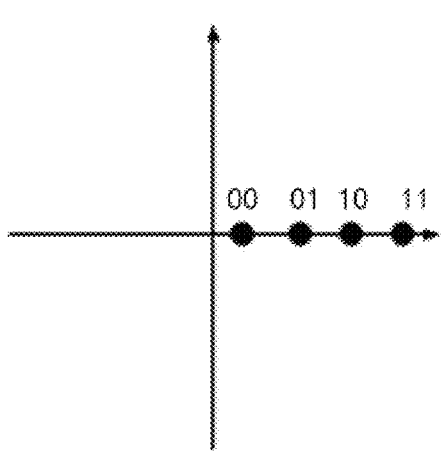
FIG. 6
| Symbol 1 | | Symbol 2 | | Symbol 3 | |
|---|---|---|---|---|---|
| Local-oscillator phase modulation | 0 ° | | 90 ° | | 0° | 90° |
| IQ receiving mode | Q1 | I1 | I2 | Q2 | Q3 | I3 |
FIG. 7
| Symbol 1 | | Symbol 2 | | Symbol 3 | |
|---|---|---|---|---|---|
| Local-oscillator phase modulation | 90° | 0° | 90° | 0° | 90° | 0° |
| Output of a detector | I1 | Q1 | I2 | Q2 | I3 | Q3 |
FIG. 8

COHERENT DETECTION METHOD, APPARATUS, AND SYSTEM

CROSS-REFERENCE TO RELATED APPLICATION

This application is a national stage filing under 35 U.S.C. § 371 of international application number PCT/CN2021/136544, filed Dec. 8, 2021, which claims priority to Chinese patent application No. 202110187937.4 filed Feb. 18, 2021. The contents of these applications are incorporated herein by reference in their entirety.

TECHNICAL FIELD

The present disclosure relates to the field of optical fiber communications, and in particular, to a coherent detection method, apparatus, and system.

BACKGROUND

With the explosive growth of intelligent terminal devices and data services, users have increasingly higher requirements for bandwidth. As a mainstream access mode, optical fiber access has the potential to meet high-bandwidth requirements of users.

Because coherent detection presents higher sensitivity than direct detection, coherent detection will be widely used in passive access networks in the future.

A conventional coherent detection system can be used to demodulate amplitude and phase simultaneously. With a complex structure, the system requires multiple pairs of balanced detectors (or balanced receivers) to achieve phase diversity and polarization diversity reception, and at the same time requires additional digital signal processing (DSP) procedures to eliminate phase noise, achieve carrier recovery, etc. These above limitations hinder the coherent optical communication from meeting requirements of short-range communication for transmission costs.

Traditional coherent detection is mainly divided into homodyne detection and heterodyne detection. Homodyne coherent detection is typically used in core transmission networks, while heterodyne detection is more used in hybrid optical and wireless networks.

A homodyne detection system requires the same frequency of laser sources of signal light and local oscillator light, which has the advantage of low bandwidth requirement for devices. However, the system requires two pairs of balanced detectors used at a receiving end to recover baseband signals, which greatly increases device costs. As shown in FIG. 1, in a phase-diversity homodyne receiving system, signal light and local oscillator light each are divided into two paths after passing through a 90° mixer and the four paths are sent to two pairs of balanced detectors respectively. An in-phase component and quadrature component of signals are directly output after photoelectric conversion.

A heterodyne detection system, as shown in FIG. 2a, requires half of the number of balanced detectors in the homodyne detection system, and a 90° mixer is not needed. Although phase diversity is not needed, because signals directly output by the detectors are still at an intermediate frequency, down conversion is still needed in electrical domain to obtain baseband signals, which is equivalent to increasing the complexity of the system. FIG. 2b shows a process of digital down conversion. A received intermediate-frequency signal is multiplied by a carrier wave and a carrier wave with a phase shift of 90 degrees separately, and an in-phase component I and a quadrature component Q of a baseband signal can be obtained by low-pass filtering.

FIG. 3 shows a DSP procedure of coherent detection in a case of single polarization state reception, including IQ orthogonalization, clock recovery, dispersion compensation, frequency offset recovery, phase estimation and decision output in sequence. Because coherent detection can obtain amplitude information and phase information of a signal, phase noise produced in the system would have a serious impact on the received signal. Phase noise is often caused by a frequency offset and linewidth of transmitter and receiver lasers. Therefore, carrier recovery algorithms such as frequency offset recovery and phase estimation are needed in subsequent DSP procedures to recover an original signal.

With the development of coherent detection technology, how to reduce the cost has become a major research hotspot. It is required to have not only a simple system structure in the optical domain, but also a simple signal processing process in the digital domain with low complexity.

To sum up, a coherent detection scheme with low device costs and low system complexity is urgently needed to address the cost problem of coherent detection system in the above access network scenario.

SUMMARY

Embodiments of the present disclosure provide a coherent detection method, apparatus, and system, to solve one of the related technical problems at least to a certain extent, including the problem of high device costs and high complexity of a conventional coherent detection system.

An embodiment of the present disclosure provides a coherent detection method, the method may include: receiving an intensity-modulated optical signal transmitted by a transmitting end, where the intensity-modulated optical signal is obtained by intensity modulation performed by the transmitting end on an original signal; performing phase modulation on a local oscillator optical signal to obtain a phase-modulated local oscillator optical signal; and mixing the intensity-modulated optical signal and the phase-modulated local oscillator optical signal, and then performing photoelectric detection, analog-to-digital conversion, and digital signal receiving processing in sequence to recover the original signal.

A further embodiment of the present disclosure provides a coherent detection method, the method may include: performing, by a transmitting end, intensity modulation on an original signal to obtain an intensity-modulated optical signal; and performing, by a receiving end, phase modulation on a local oscillator optical signal to obtain a phase-modulated local oscillator optical signal, mixing the phase-modulated local oscillator optical signal and the intensity-modulated optical signal transmitted by the transmitting end, and then performing photoelectric detection, analog-to-digital conversion, and digital signal receiving processing in sequence to recover the original signal.

A further embodiment of the present disclosure provides a coherent detection apparatus, the apparatus may include: a signal receiving module configured to receive an intensity-modulated optical signal transmitted by a transmitting end, where the intensity-modulated optical signal is obtained by intensity modulation performed by the transmitting end on an original signal; a phase modulation module configured to perform phase modulation on a local oscillator optical signal to obtain a phase-modulated local oscillator optical signal; and a signal recovery module configured to mix the intensity-modulated optical signal and the phase-modulated local oscillator optical signal, and then perform photoelectric detection, analog-to-digital conversion, and digital signal receiving processing in sequence to recover the original signal.

A further embodiment of the present disclosure provides a coherent detection system, the system may include a transmitting end and a receiving end, where the transmitting end is configured to perform intensity modulation on an original signal to obtain an intensity-modulated optical signal; and the receiving end includes the foregoing coherent detection apparatus.

BRIEF DESCRIPTION OF DRAWINGS

FIG. 5b is a second schematic block diagram of a coherent detection system provided by an embodiment of the present disclosure;

FIG. 6 is a constellation diagram of signal mapping of a PAM4 signal provided by an embodiment of the present disclosure;

FIG. 7 is a schematic diagram of a phase modulation scheme for local oscillator light and a signal IQ component receiving mode provided by an embodiment of the present disclosure;

FIG. 8 is a schematic diagram of a suboptimal phase modulation scheme for local oscillator light provided by an embodiment of the present disclosure;

DETAILED DESCRIPTION

It should be understood that the particular embodiments described herein are only intended to explain the present disclosure, and are not intended to limit the present disclosure.

Figure 4:
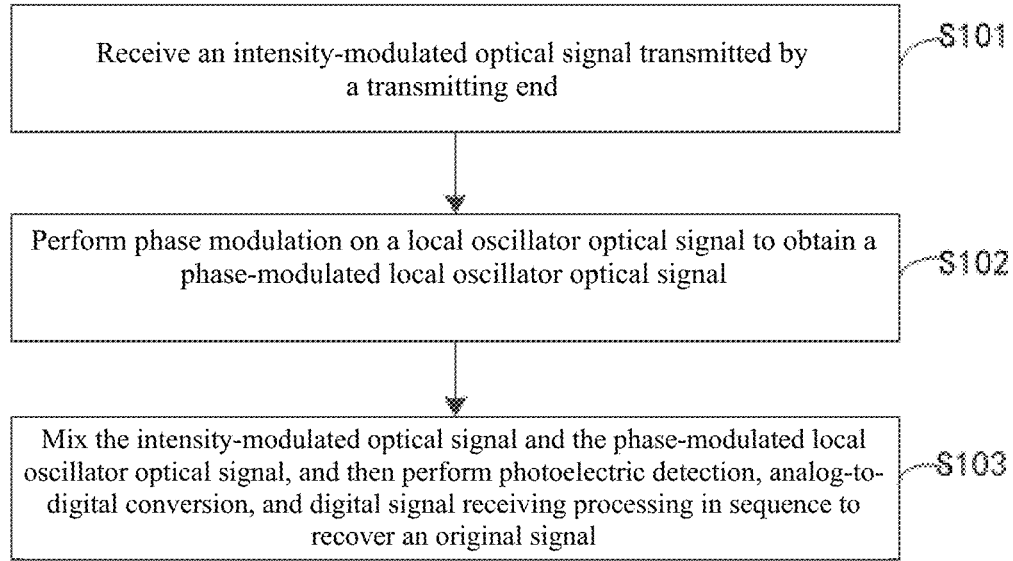
FIG. 4 is a flowchart of a coherent detection method provided by an embodiment of the present disclosure.

FIG. 4 is a flowchart of a coherent detection method provided by an embodiment of the present disclosure. As shown in FIG. 4, the method may include the following steps.

At S101, an intensity-modulated optical signal transmitted by a transmitting end is received. The intensity-modulated optical signal is obtained by intensity modulation performed by the transmitting end on an original signal.

At S102, phase modulation is performed on a local oscillator optical signal to obtain a phase-modulated local oscillator optical signal.

In an implementation, S102 may include: performing phase modulation on the local oscillator optical signal in each symbol period to obtain a phase-modulated local oscillator optical signal, where a modulation frequency of the phase-modulated local oscillator optical signal is consistent with a symbol rate of the intensity-modulated optical signal. Alternatively, S102 may include: performing phase modulation twice on the local oscillator optical signal in each symbol period to obtain in sequence two phase-modulated local oscillator optical signals with different phases, where a modulation frequency of each of the phase-modulated local oscillator optical signals is twice a symbol rate of the intensity-modulated optical signal.

At S103, the intensity-modulated optical signal and the phase-modulated local oscillator optical signal are mixed, and then photoelectric detection, analog-to-digital conversion, and digital signal receiving processing are performed in sequence to recover the original signal.

In an implementation, S101 may include: using a polarization controller (PC) to adjust a polarization state of the intensity-modulated optical signal transmitted by the transmitting end, so that the polarization state of the intensity-modulated optical signal is consistent with a polarization state of the phase-modulated local oscillator optical signal. In another implementation, the method further includes: using a first polarizing beam splitter (PBS) to divide the phase-modulated local oscillator optical signal into two phase-modulated local oscillator optical signals with orthogonal polarization states. Accordingly, S101 may include: using a second PBS to divide the intensity-modulated optical signal transmitted by the transmitting end into two intensity-modulated optical signals with orthogonal polarization states, so as to obtain two groups of intensity-modulated optical signals and phase-modulated local oscillator optical signals with consistent polarization states. That is, in addition to using a polarization controller to control the polarization of the received intensity-modulated optical signal, two PBSs may alternatively be used to perform polarization diversity on the intensity-modulated optical signal and the phase-modulated local oscillator optical signal, respectively, so as to coherently detect the intensity-modulated optical signal and the phase-modulated local oscillator optical signal in the same polarization state. In other words, the polarization controller and the first and second PBSs are both used to keep the polarization state of the intensity-modulated optical signal consistent with the polarization state of the phase-modulated local oscillator optical signal.

S101 may further include: adjusting, before the polarization state is adjusted, a received optical power of the intensity-modulated optical signal transmitted by the transmitting end.

A group of intensity-modulated optical signal and phase-modulated local oscillator optical signal, with a consistent polarization state, obtained by using the polarization controller, and any of two groups of intensity-modulated optical signals and phase-modulated local oscillator optical signals, with consistent polarization states, obtained by using the PBS, each can be used in S103 to recover the signal.

S103 may include: mixing the intensity-modulated optical signal and the phase-modulated local oscillator optical signal with the consistent polarization state; performing photoelectric detection on a mixed optical signal to obtain an electrical signal including an in-phase component and a quadrature component of each symbol; performing analog-to-digital conversion on the electrical signal including the in-phase component and quadrature component of each symbol; and performing decision demodulation on a digital signal including the in-phase component and quadrature component of each symbol after analog-to-digital conversion, to recover the original signal.

In an implementation, performing decision demodulation on a digital signal including the in-phase component and quadrature component of each symbol after analog-to-digital conversion, to recover the original signal includes: extracting the in-phase component and quadrature component of each symbol; and performing modular decision on the in-phase component and quadrature component of each symbol to recover the original signal.

In another implementation, performing decision demodulation on a digital signal including the in-phase component and quadrature component of each symbol after analog-to-digital conversion, to recover the original signal includes: extracting the in-phase component and quadrature component of each symbol; and performing orthogonalization on the extracted in-phase component and quadrature component of each symbol, so that the modular decision is performed on an in-phase component and a quadrature component of each symbol obtained after the orthogonalization, to recover the original signal.

Figure 1:
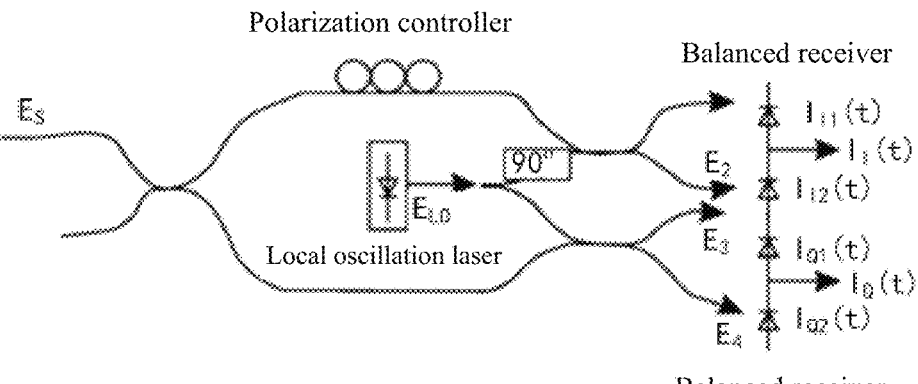
FIG. 1 is a schematic diagram of a phase-diversity homodyne receiving system.
Figure 2A:
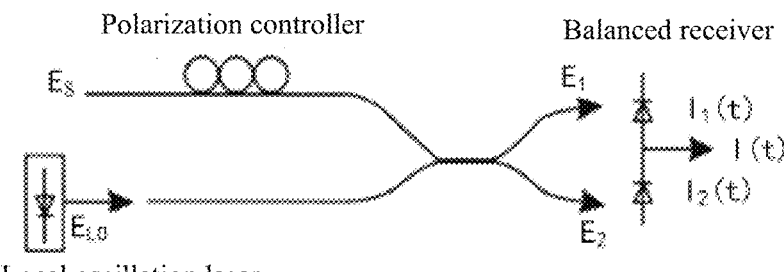
FIG. 2a is a schematic diagram of a phase-diversity heterodyne receiving system.
Figure 2B:
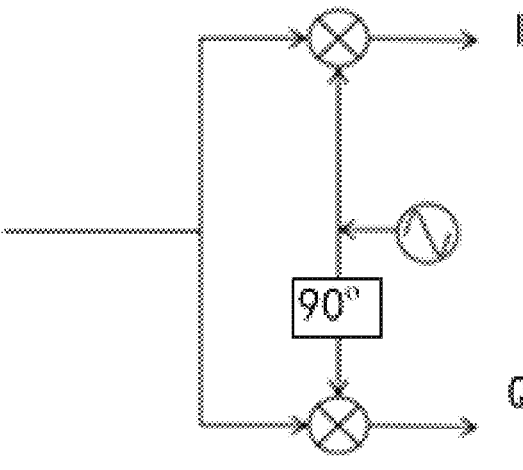
FIG. 2b is a schematic diagram of a digital down conversion process.
Figure 3:
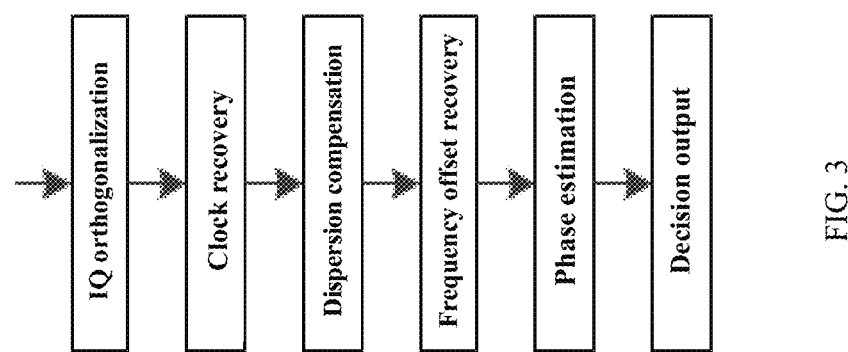
FIG. 3 is a schematic diagram of a DSP procedure for coherent detection in a case of single polarization state reception.

Accordingly, an embodiment of the present disclosure provides a coherent detection apparatus that can implement the embodiment of FIG. 1. The apparatus may include: a signal receiving module, a phase modulation module, and a signal recovery module.

The signal receiving module configured to receive an intensity-modulated optical signal transmitted by a transmitting end, where the intensity-modulated optical signal is obtained by intensity modulation performed by the transmitting end on an original signal.

The phase modulation module configured to perform phase modulation on a local oscillator optical signal to obtain a phase-modulated local oscillator optical signal. In an implementation, the phase modulation module includes: an adjustable electrical delay line configured to control phase modulation on the local oscillator optical signal; and a phase modulator (PM) configured to: under the control of the adjustable electrical delay line, perform phase modulation on the local oscillator optical signal to obtain the phase-modulated local oscillator optical signal. Here, in an implementation, the phase modulator performs, under the control of the adjustable electrical delay line, phase modulation on the local oscillator optical signal in each symbol period to obtain the phase-modulated local oscillator optical signal, where a modulation frequency of the phase-modulated local oscillator optical signal is consistent with a symbol rate of the intensity-modulated optical signal. In another implementation, the phase modulator performs, under the control of the adjustable electrical delay line, phase modulation twice on the local oscillator optical signal in each symbol period to obtain in sequence two phase-modulated local oscillator optical signals with different phases, where a modulation frequency of each of the phase-modulated local oscillator optical signals is twice a symbol rate of the intensity-modulated optical signal.

The signal recovery module is configured to mix the intensity-modulated optical signal and the phase-modulated local oscillator optical signal, and then perform photoelectric detection, analog-to-digital conversion, and digital signal receiving processing in sequence to recover the original signal.

In an implementation, the signal receiving module may include: a polarization controller configured to adjust a polarization state of the intensity-modulated optical signal transmitted by the transmitting end, so that the polarization state of the intensity-modulated optical signal is consistent with a polarization state of the phase-modulated local oscillator optical signal. In another implementation, the apparatus further includes: a first PBS configured to divide the phase-modulated local oscillator optical signal into two phase-modulated local oscillator optical signals with orthogonal polarization states. Accordingly, the signal receiving module includes: a second PBS configured to divide the intensity-modulated optical signal transmitted by the transmitting end into two intensity-modulated optical signals with orthogonal polarization states, so as to obtain two groups of intensity-modulated optical signals and phase-modulated local oscillator optical signals with consistent polarization states. That is, in addition to using a polarization controller to control the polarization of the received intensity-modulated optical signal, two PBSs may alternatively be used to perform polarization diversity on the intensity-modulated optical signal and the phase-modulated local oscillator optical signal, respectively, so as to coherently detect the intensity-modulated optical signal and the phase-modulated local oscillator optical signal in the same polarization state. In other words, the polarization controller and the first and second PBSs are both used to keep the polarization state of the intensity-modulated optical signal consistent with the polarization state of the phase-modulated local oscillator optical signal.

In addition, the signal receiving module may further include: a variable optical attenuator (VOA) configured to adjust, before the polarization state is adjusted, a received optical power of the intensity-modulated optical signal transmitted by the transmitting end.

When a group of intensity-modulated optical signal and phase-modulated local oscillator optical signal, with a consistent polarization state, are obtained by using the polarization controller, the signal recovery module includes a group of devices, namely an OC, a balanced detector, an analog-to-digital converter (ADC), and a digital signal receiver. When two groups of intensity-modulated optical signals and phase-modulated local oscillator optical signals, with consistent polarization states, are obtained by using the PBS, the signal recovery module includes two groups of devices, each group including an OC, a balanced detector, an ADC, and a digital signal receiver, to respectively use one group of intensity-modulated optical signal and phase-modulated local oscillator optical signal with a consistent polarization state to recover the signal.

Here, the OC is configured to mix the intensity-modulated optical signal and the phase-modulated local oscillator optical signal with the consistent polarization state; the balanced detector is configured to perform photoelectric detection on a mixed optical signal to obtain an electrical signal including an in-phase component and a quadrature component of each symbol; the ADC is configured to perform analog-to-digital conversion on the electrical signal including the in-phase component and quadrature component of each symbol; and the digital signal receiver is configured to perform decision demodulation on a digital signal including the in-phase component and quadrature component of each symbol after analog-to-digital conversion, to recover the original signal. Here, in an implementation, the digital signal receiver is configured to extract the in-phase component and quadrature component of each symbol; and perform modular decision on the in-phase component and quadrature component of each symbol to recover the original signal. In another implementation, the digital signal receiver is configured to extract the in-phase component and quadrature component of each symbol; and perform orthogonalization on the extracted in-phase component and quadrature component of each symbol, so that the modular decision is performed on an in-phase component and a quadrature component of each symbol obtained after the orthogonalization, to recover the original signal. Compared with the previous implementation, this implementation is applicable to the case of IQ component imbalance, that is, orthogonalization is first performed on the extracted in-phase component and quadrature component of each symbol to eliminate the IQ imbalance issue, and then modular decision is performed on an in-phase component and a quadrature component of each symbol obtained after the orthogonalization.

According to the coherent detection method and apparatus provided by the foregoing embodiments of the present disclosure, which are applied to the receiving end, by using the phase-modulated local oscillator optical signal, homodyne detection of phase diversity is avoided, and IQ components of the signal can be obtained through only a pair of balanced detectors, thus reducing device costs of a system. In addition, by using the intensity-modulated optical signal, the subsequent use of a carrier recovery algorithm is avoided, thus reducing the complexity of the system.

A further embodiment of the present disclosure provides a coherent detection method, including: performing, by a transmitting end, intensity modulation on an original signal to obtain an intensity-modulated optical signal; and performing, by a receiving end, phase modulation on a local oscillator optical signal to obtain a phase-modulated local oscillator optical signal, mixing the phase-modulated local oscillator optical signal and the intensity-modulated optical signal transmitted by the transmitting end, and then performing photoelectric detection, analog-to-digital conversion, and digital signal receiving processing in sequence to recover the original signal. Here, by biasing and adjusting an amplitude of original information, the transmitting end obtains the intensity-modulated optical signal, which can make the receiving end decide the signal through a modulus of the signal. Processing steps by the receiving end are the same as those of the embodiment in FIG. 1, and will not be repeated herein.

Accordingly, a further embodiment of the present disclosure provides a coherent detection system for the above-described coherent detection method. The system includes a transmitting end and a receiving end. The transmitting end is configured to perform intensity modulation on an original signal to obtain an intensity-modulated optical signal. The receiving end includes the foregoing coherent detection apparatus. Details are not repeated herein.

According to the coherent detection method and system provided by the foregoing embodiments of the present disclosure, by using the phase-modulated local oscillator optical signal, the use of phase diversity is avoided, and I component and Q component of the signal can be obtained through only a pair of balanced detectors, thus reducing device costs of the system. In addition, by using the intensity-modulated optical signal, the subsequent use of a carrier recovery algorithm is avoided, thus reducing the complexity of the system.

The present disclosure is described in detail below with reference to FIG. 1, and FIGS. 5*a* to 13.

Figure 5A:
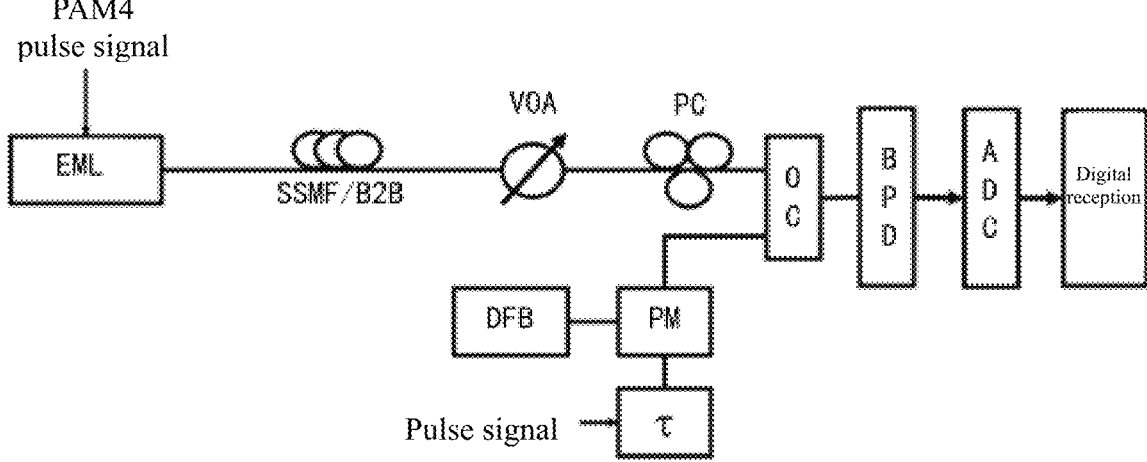
FIG. 5a is a first schematic block diagram of a coherent detection system provided by an embodiment of the present disclosure.

FIG. 5*a* is a first schematic block diagram of a coherent detection system provided by an embodiment of the present disclosure. As shown in FIG. 5*a*, the coherent detection system, provided by the present embodiment, based on phase-modulated local oscillator light includes: one electro-absorption modulated laser (EML) (which can also be referred to as electro-absorption modulator, intensity modulator, or electro-absorption modulated distributed feedback laser), one distributed feedback laser (DFB), a pulse signal generator, a balanced detector (which can also be referred to as balanced receiver, or balanced photodiode (BPD)), a PC, a PM, an adjustable electrical delay line ( $\tau$ ), an ADC, a digital signal receiving module (equivalent to the foregoing digital signal receiver), a single-mode optical fiber (SSMF), a VOA, and an OC.

At a transmitting end, a pulse signal generator generates a 4 Pulse Amplitude Modulation (PAM4) pulse signal, which drives the electro-absorption modulator to perform intensity modulation, and a light wave signal output after the intensity modulation is transmitted by the SSMF or through Back to back (B2B) transmission.

At a receiving end, the light wave signal in the SSMF is first input to the VOA to adjust a received optical power, and then mixed with a local oscillator optical signal after a polarization state of the light wave signal is adjusted by the PC. The local oscillator optical signal is obtained by processing by the PM on a light wave signal generated by the DFB. The adjustable electrical delay line is used to control the phase modulation on the local oscillator optical signal. A mixed optical signal is input to the balanced receiver for photoelectric detection, and an obtained electrical signal is digitally received after analog-to-digital conversion, for subsequent signal processing.

Optical communication simulation software is used below to verify the homodyne detection system using a phase-modulated local oscillator light in the PAM4 modulation format in this embodiment. In the simulation, a center wavelength of the EML is 1550 nm and a linewidth is 1 MHz, and a center wavelength of the DFB is 1550 nm and a linewidth is 1 MHz. Here, the center wavelength of the electro-absorption modulator is tunable to simulate a frequency shift between signal light and local oscillator light.

At the transmitting end, a binary sequence is generated by a pseudorandom sequence generator. After bit mapping, a PAM4 signal is generated by the pulse signal generator at a rate of 50 Gbit/s and a baud rate of 25 Gbaud. The light wave signal after intensity modulation (that is, the intensity-modulated optical signal) by the electro-absorption modulator driven by the PAM4 signal is transmitted B2B after electro-optic modulation. A bit-mapping constellation diagram of the PAM4 signal is shown in FIG. 6, and the PAM4 signal in FIG. 6 can be obtained by adjusting a bias voltage of the intensity modulator and an amplitude of a pulse signal. In this case, even if large phase noise exists, which causes rotation of the received signal constellation, that is, the constellation presents four rings, the signal can still be decided through a modulus of the signal, thus avoiding the use of the carrier recovery algorithm.

At the receiving end, the signal first undergoes adjustment of a received optical power by the VOA and adjustment of a polarization state by the PC to keep consistent with a polarization state of the local oscillator light. Then, the signal is input into the OC having a coupling ratio of 50% to mix with the local oscillator light. Then, a balanced detector with a bandwidth of 50 GHz and a sensitivity of 1 A/W is used to perform photoelectric conversion on the mixed optical signal.

Here, the local oscillator light is generated by phase modulation performed on the light wave signal generated by the DFB. The PM is driven by a binary pulse signal with a frequency of 25 GHz, so that two levels of the pulse signal correspond to 0° phase modulation and 90° phase modulation respectively. When phase modulation of the local oscillator light is 90°, the balanced detector correspondingly outputs an in-phase component of the signal, while when the phase modulation is 0°, the balanced detector correspondingly outputs a quadrature component of the signal.

In an implementation, a specific phase modulation scheme of the local oscillator light at the receiving end can be shown in FIG. 7. In other words, ideally, a modulation frequency of the phase modulation on the local oscillator light is the same as a symbol rate of the signal, and the phase modulation is interleaved with reception of symbols. In an implementation, the modulation phase of the local oscillator light is changed at a middle moment in each symbol period. In this way, the balanced detector will output the in-phase component and quadrature component of each symbol according to an order of IQQI shown in the figure, and if the signal is received in this order, each symbol can be completely recovered. The use of the adjustable electrical delay line is to ensure that the phase modulation of local oscillator light and the reception of symbols are just staggered by half a symbol period.

A digital storage oscilloscope is used to receive the signal output by the balanced detector, that is, ADC. A sampling rate of the oscilloscope is set to twice the symbol rate of the signal, which is 50 Gsample/s. Since the received signal contains the in-phase component I and quadrature component Q of each symbol, it is necessary to extract the two components in serial signal data in a specific order. A receiving order of IQ components of the signal is shown in FIG. 7. Taking three received symbols as an example, a 90° phase modulation period of local oscillator light corresponds to the first half period of a first symbol and a third symbol and the second half period of a second symbol, and a 0° phase modulation period corresponds to the second half period of the first symbol and the third symbol and the first half period of the second symbol. Therefore, the in-phase component and quadrature component of each of these three symbols should be extracted in the order of IQQIIQ. Similarly, a final output signal is in the form of repeated IQQI, and the two components of each symbol are extracted in this order.

In another implementation, the specific phase modulation scheme of the local oscillator light at the receiving end may alternatively be shown in FIG. 8, which can achieve the same effect as the foregoing embodiment. In an implementation, this scheme requires that the modulation phase of the local oscillator light be changed twice per symbol period, that is, the frequency of the phase modulation on the local oscillator light is 50 GHz, which is twice the symbol rate of the signal (the rates of both are the same in the foregoing embodiment). In this case, corresponding to each symbol period, the balanced detector will output an in-phase component of the symbol in the first half period, and output a quadrature component in the second half period. In subsequent digital reception, the in-phase component and quadrature component should be extracted according to the order of IQIQ.

FIG. 5b is a second schematic block diagram of a coherent detection system provided by an embodiment of the present disclosure. As shown in FIG. 5b, polarization diversity reception is used instead of the use of PC shown in FIG. 5a. In an implementation, a first PBS divides the phase-modulated local oscillator optical signal into two phase-modulated local oscillator optical signals with orthogonal polarization states. A second PBS divides the intensity-modulated optical signal transmitted by the transmitting end into two intensity-modulated optical signals with orthogonal polarization states, so as to obtain two groups of intensity-modulated optical signals and phase-modulated local oscillator optical signals with consistent polarization states. In other words, in the case of polarization diversity, the PC is not needed in this embodiment to adjust the polarization state of the signal. Instead, the PBS is used to divide the signal into two intensity-modulated optical signals with orthogonal polarization states, for respective optical mixing with the two phase-modulated local oscillator optical signals with orthogonal polarization states, and then performs optical detection. In a subsequent DSP procedure, additional polarization demultiplexing is needed to recover a signal in the polarization state, and other algorithms are consistent with the single polarization state reception, which can achieve the same effect as the embodiment of FIG. 5a.

This embodiment of the present disclosure is a low-cost coherent detection technology in a passive access network scenario, which performs coherent detection based on the phase-modulated local oscillator light, and a frequency of the used local oscillator light laser is consistent with a frequency of a signal light laser at the transmitting end. Therefore, this embodiment is still in the category of homodyne detection. Compared with a conventional local oscillator light form, this embodiment of the present disclosure uses phase modulation on local oscillator light instead of phase diversity. Compared with a conventional phase diversity homodyne detection system, this embodiment of the present disclosure only needs a pair of balanced detectors to demodulate the signal, and does not need to use a 90° optical mixer, so that device costs are greatly reduced.

Further, because the in-phase component and the quadrature component of each symbol are obtained by two adjacent samples, a frequency offset of the laser at the transmitting end will lead to IQ component imbalance of the signal.

The IQ component imbalance of the symbol due to the frequency offset of the laser can be expressed by the following equations:

$$I_n = A \cos(\phi + 2\pi 2n\Delta fT)$$

$$Q_n = A \sin(\phi + 2\pi(2n+1)\Delta fT)$$

The equations express the IQ component of an $n^{th}$ received symbol, where A denotes a signal strength, T denotes a sampling time, $\phi$ denotes phase noise, and the last item is a cumulative phase offset caused by frequency offset $\Delta f$. A phase offset between the I component and Q component of the same symbol is $2\pi\Delta fT$.

The Gram-Schmidt orthogonalization algorithm is used to eliminate the IQ imbalance. It is measured that when there is a frequency offset of −5 to 5.5 GHz, a power compensation of 3 db will be generated. Therefore, a maximum frequency offset that is allowed in this embodiment is approximately ±Rs/5, where Rs denotes symbol rate.

Figure 9:
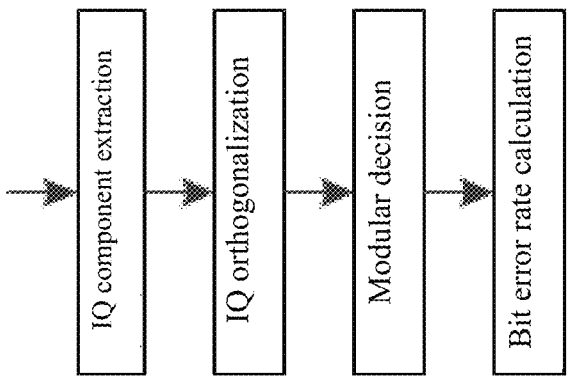
FIG. 9 is a schematic diagram of a signal processing procedure provided by an embodiment of the present disclosure.

FIG. 9 is a schematic diagram of a signal processing procedure provided by an embodiment of the present disclosure. As shown in FIG. 9, the subsequent DSP procedure may include: after extracting the in-phase component and quadrature component of each symbol, performing orthogonalization on the signal to eliminate IQ imbalance, performing direct modular decision to restore the original signal, and finally calculating a bit error rate.

It should be noted that the conventional homodyne system with phase diversity reception, as shown in FIG. 1, can finally output two signals as follows:

$$I_I(t) = R\sqrt{P_s P_{LO}} \cos\{\theta_s(t) - \theta_{LO}(t)\}$$

$$I_Q(t) = R\sqrt{P_s P_{LO}} \sin\{\theta_s(t) - \theta_{LO}(t)\}$$

The in-phase component and quadrature component in the above two equations together determine a final signal:

$$I(t) = R\sqrt{P_s P_{LO}} \exp\{j[\theta_s(t) - \theta_n(t)]\}$$

In the equations, R denotes a response degree of photodiode, $P_s$ denotes a signal power, $P_{LO}$ denotes a local oscillator optical power, $\theta_s$ denotes a modulation phase of the signal, and $\theta_n$ denotes phase noise.

The phase noise is mainly caused by the frequency offset and linewidth of a laser source at the transmitting end and receiving end, which is inevitable and will cause rotation of the constellation of the received signal. When a signal in an intensity-modulated format is received coherently, intensity and phase of the signal are detected. The signal can be expressed as the following equation:

$$I(t) = R\sqrt{P_s(t) P_{LO}} \exp\{j\varphi(t)\}$$

Because the intensity signal does not have its own modulation phase, the phase of the received signal only has phase offset φ caused by the frequency offset and phase noise. In an ideal case, when the phase offset is 0°, only the in-phase component of the signal has a value. When a phase offset exists, a phase of the signal will rotate, that is, the signal has values on both the in-phase component I and quadrature component Q, which finally shows the rotation of the signal constellation.

In this embodiment of the present disclosure, after the signal in the intensity-modulated format is used at the transmitting end, after obtaining the in-phase component and quadrature component of the signal, the receiving end can calculate a modulus, and can perform decision demodulation on the signal, without the use of additional carrier recovery algorithm, so that the complexity in a digital domain is reduced.

Figure 10A:
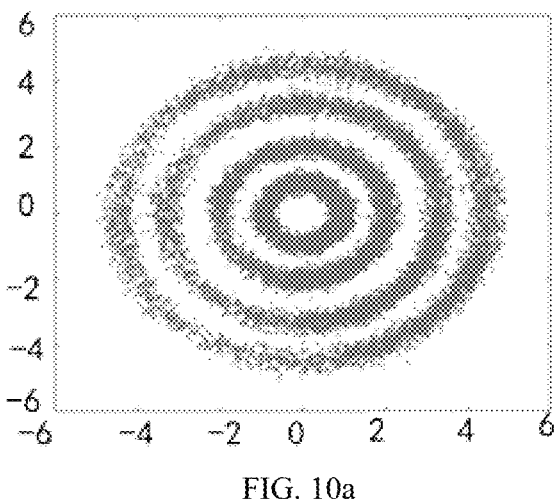
FIG. 10a and FIG. 10b are respectively a signal constellation diagram and a signal modulus diagram, provided by an embodiment of the present disclosure, obtained by simulation when a received optical power is –20 dbm and no frequency offset exists between local oscillator light and signal light.
Figure 10B:
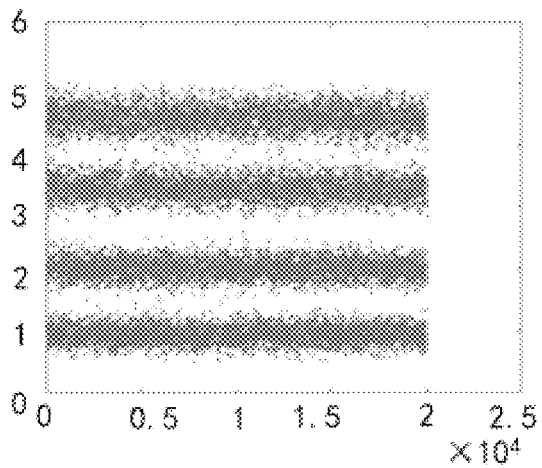

For example, the received optical power is −20 dbm and no frequency offset exists between the local oscillator light and the signal light. FIG. 10a is a constellation diagram of a received signal. The constellation diagram of the signal has rotated to present four rings due to phase noise. FIG. 10b is a modulus diagram of the signal. In FIG. 10b, four levels can be clearly distinguished. In this case, a lower bit error rate can be obtained by directly performing decision on a PAM4 signal.

Figure 11A:
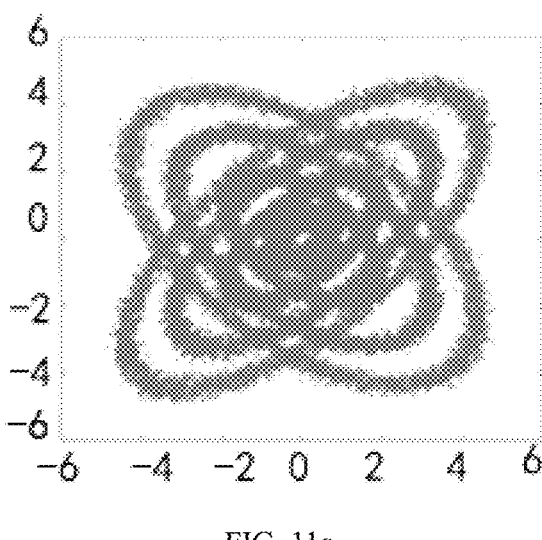
FIG. 11a, FIG. 11b, and FIG. 11c are respectively a signal constellation diagram before orthogonalization, a signal constellation diagram after orthogonalization, and a signal modulus diagram, provided by an embodiment of the present disclosure, obtained by simulation when a received optical power is –20 dbm and a frequency offset of 5 GHz exists between local oscillator light and signal light.
Figure 11B:
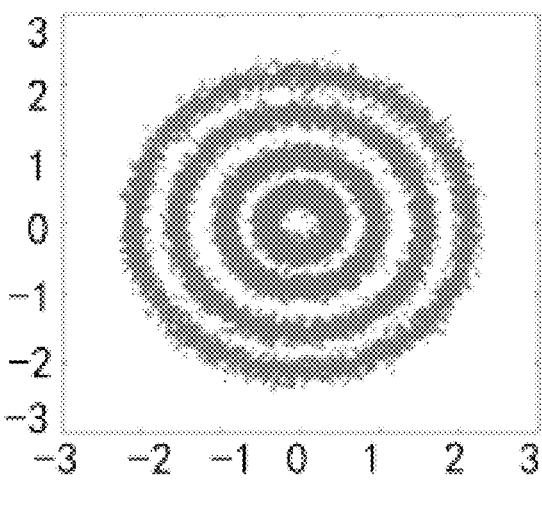
Figure 11C:
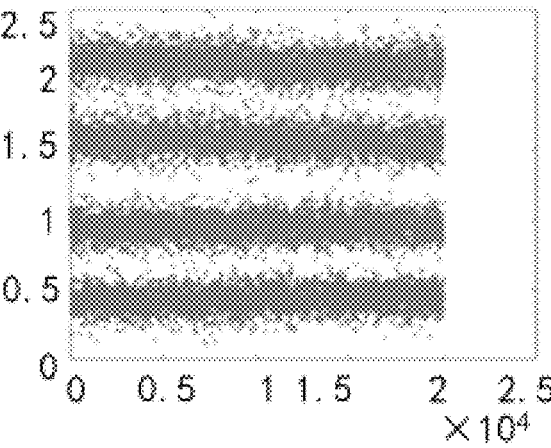

For example, the received optical power is −20 dbm and a frequency offset of 5 GHz exists between the local oscillator light and the signal light. FIG. 11a is a signal constellation diagram with the impact of IQ component imbalance. Because the signal is received in the order of IQQI, phase displacement angles between the in-phase component and quadrature component of the symbol corresponding to the order of IQ and the order of QI are reversed. This results in a constellation diagram in FIG. 11a in which the two IQ component imbalances superimpose together. After using an orthogonalization algorithm to eliminate IQ component imbalance caused by the frequency offset, the constellation diagram is restored to four rings as shown in FIG. 11b, and in a finally obtained PAM4 signal modulus diagram as shown in FIG. 11c, four levels can still be clearly distinguished with naked eyes. The bit error rate in this case is still low.

Figure 12A:
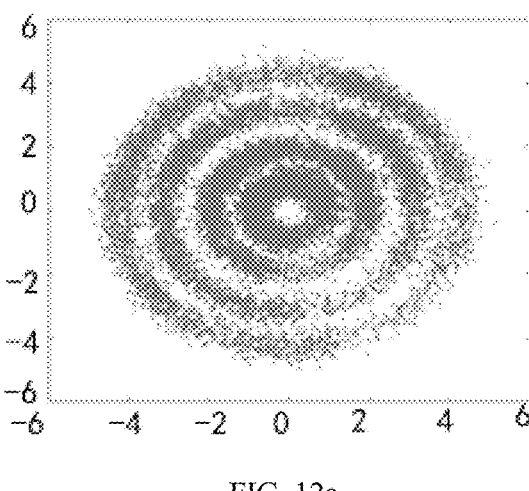
FIG. 12a and FIG. 12b are respectively a signal constellation diagram and a signal modulus diagram, provided by an embodiment of the present disclosure, obtained by simulation when a received optical power is –25 dbm and no frequency offset exists between local oscillator light and signal light.
Figure 12B:
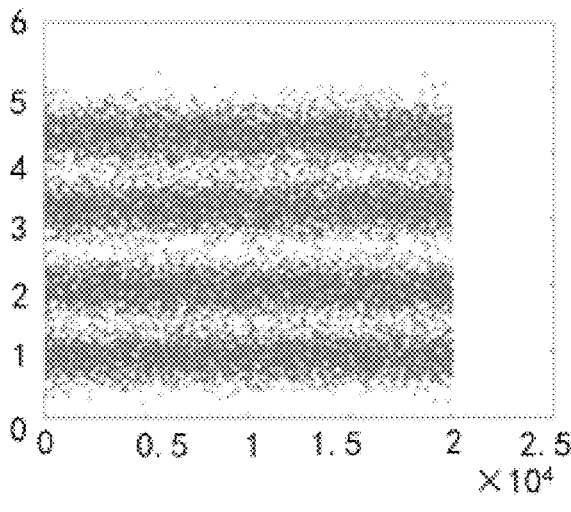

For example, the received optical power is −25 dbm, and no frequency offset exists between the local oscillator light and the signal light. As shown in FIGS. 12a and 12b, similar to FIGS. 11a and 11b, an optical signal-to-noise ratio is low, and the modulus diagram of the received signal still presents four levels, but a small overlapping area has appeared. As a result, the bit error rate for decision on the modulus is high.

Figure 13A:
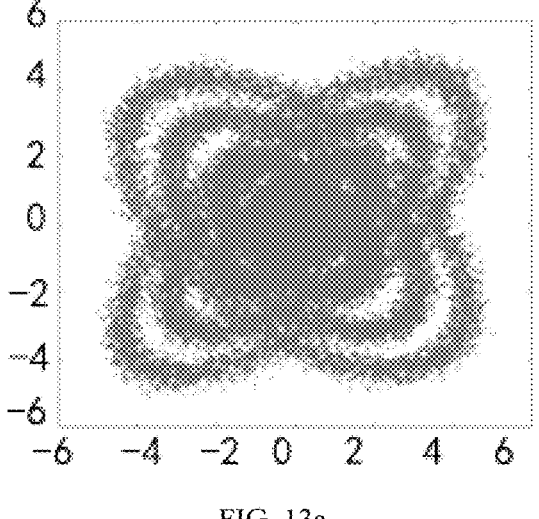
FIG. 13a, FIG. 13b, and FIG. 13c are respectively a signal constellation diagram before orthogonalization, a signal constellation diagram after orthogonalization, and a signal modulus diagram, provided by an embodiment of the present disclosure, obtained by simulation when a received optical power is –25 dbm and a frequency offset of 5 GHz exists between local oscillator light and signal light.
Figure 13B:
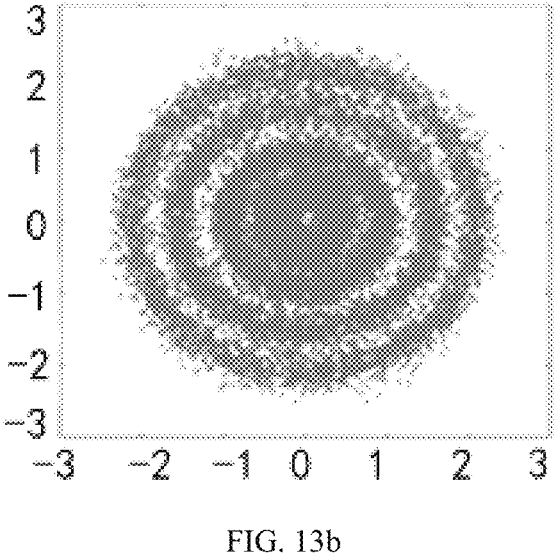
Figure 13C:
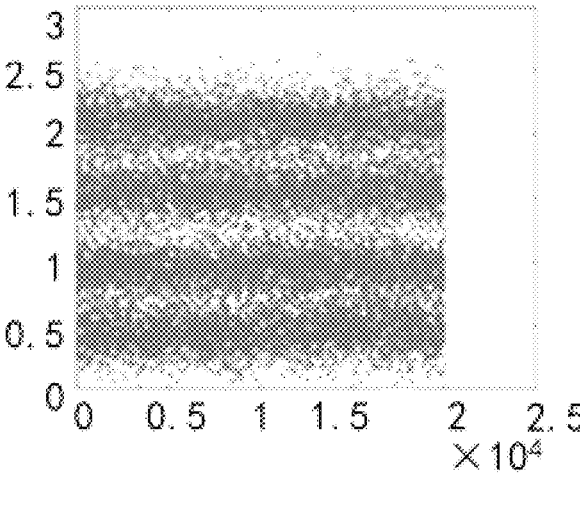

For example, the received optical power is −25 dbm and a frequency offset of 5 GHz exists between the local oscillator light and the signal light. As shown in FIGS. 13a, 13b and 13c, similar to FIGS. 11a and 11b, an overlapping part of four levels in a modulus diagram of an obtained PAM4 signal in this case is obviously larger than that in the case in which no frequency offset exists. In order to solve the issue of IQ component imbalance caused by the frequency offset, the use of orthogonalization algorithm will lead to an increase in the bit error rate to a certain extent.

The embodiments of the present disclosure have the following technical effects:

1. The receiving end of the embodiments of the present disclosure performs phase modulation rather than phase diversity on the local oscillator light, which saves half of hardware overheads of a receiver and reduces costs compared with the conventional phase diversity homodyne detection scheme.

2. In the subsequent DSP procedure of the embodiments of the present disclosure, there is no need to use an additional carrier recovery algorithm; and the orthogonalization algorithm is used to solve the additional IQ component imbalance. This has low complexity and is easy to realize.

According to the coherent detection method, apparatus, and system provided by the embodiments of the present disclosure, by using the phase-modulated local oscillator optical signal, the use of phase diversity is avoided, and I component and Q component of the signal can be obtained through only a pair of balanced detectors, thus reducing device costs of the system. In addition, by using the intensity-modulated optical signal, the subsequent use of the carrier recovery algorithm is avoided, thus reducing the complexity of the system.

Some embodiments of the present disclosure have been described above with reference to the accompanying drawings and are not to limit the scope of the present disclosure. Any modifications, equivalent substitutions, and improvements made by those of ordinary skill in the art without departing from the scope and essence of the present disclosure shall fall within the scope of the present disclosure.

The invention claimed is:

1. A coherent detection method, comprising:
receiving an intensity-modulated optical signal transmitted by a transmitting end, wherein the intensity-modulated optical signal is obtained by intensity modulation performed by the transmitting end on an original signal, and the intensity-modulated optical signal excludes a phase-modulated optical signal;
performing phase modulation on a local oscillator optical signal to obtain a phase- modulated local oscillator optical signal; and
mixing the intensity-modulated optical signal and the phase-modulated local oscillator optical signal, and then performing photoelectric detection, analog-to-digital conversion, and digital signal receiving processing in sequence to recover the original signal;
wherein performing phase modulation on a local oscillator optical signal to obtain a phase-modulated local oscillator optical signal comprises:
performing phase modulation on the local oscillator optical signal in each symbol period to obtain a phase- modulated local oscillator optical signal, wherein a modulation frequency of the phase-modulated local oscillator optical signal is consistent with a symbol rate of the intensity-modulated optical signal; or
performing phase modulation twice on the local oscillator optical signal in each symbol period to obtain in sequence two phase-modulated local oscillator optical signals with different phases, wherein a modulation frequency of each of the phase-modulated local oscillator optical signals is twice a symbol rate of the intensity-modulated optical signal.

2. The method of claim 1, wherein receiving an intensity-modulated optical signal transmitted by a transmitting end comprises:
using a polarization controller to adjust a polarization state of the intensity-modulated optical signal transmitted by the transmitting end, so that the polarization state of the intensity-modulated optical signal is consistent with a polarization state of the phase-modulated local oscillator optical signal.

3. The method of claim 2, wherein mixing the intensity-modulated optical signal and the phase-modulated local oscillator optical signal, and then performing photoelectric detection, analog-to-digital conversion, and digital signal receiving processing in sequence to recover the original signal comprises:
mixing the intensity-modulated optical signal and the phase-modulated local oscillator optical signal with a consistent polarization state;
performing photoelectric detection on a mixed optical signal to obtain an electrical signal comprising an in-phase component and a quadrature component of each symbol;
performing analog-to-digital conversion on the electrical signal comprising the in-phase component and quadrature component of each symbol; and
performing decision demodulation on a digital signal comprising the in-phase component and quadrature component of each symbol after analog-to-digital conversion, to recover the original signal.

4. The method of claim 3, wherein performing decision demodulation on a digital signal comprising the in-phase component and quadrature component of each symbol after analog-to-digital conversion, to recover the original signal comprises:
extracting the in-phase component and quadrature component of each symbol; and
performing modular decision on the in-phase component and quadrature component of each symbol to recover the original signal.

5. The method of claim 4, wherein the method further comprises:
performing orthogonalization on the extracted in-phase component and quadrature component of each symbol before modular decision is performed on the in-phase component and quadrature component of each symbol, so that the modular decision is performed on an in-phase component and a quadrature component of each symbol obtained after the orthogonalization.

6. The method of claim 1, wherein the method further comprises:
using a first polarizing beam splitter to divide the phase-modulated local oscillator optical signal into two phase-modulated local oscillator optical signals with orthogonal polarization states; and
accordingly, receiving an intensity-modulated optical signal transmitted by a transmitting end comprises:
using a second polarizing beam splitter to divide the intensity-modulated optical signal transmitted by the transmitting end into two intensity-modulated optical signals with orthogonal polarization states, so as to obtain two groups of intensity-modulated optical signals and phase-modulated local oscillator optical signals with consistent polarization states.

7. The method of claim 6, wherein mixing the intensity-modulated optical signal and the phase-modulated local oscillator optical signal, and then performing photoelectric detection, analog-to-digital conversion, and digital signal receiving processing in sequence to recover the original signal comprises:
mixing the intensity-modulated optical signal and the phase-modulated local oscillator optical signal with a consistent polarization state;
performing photoelectric detection on a mixed optical signal to obtain an electrical signal comprising an in-phase component and a quadrature component of each symbol;
performing analog-to-digital conversion on the electrical signal comprising the in-phase component and quadrature component of each symbol; and
performing decision demodulation on a digital signal comprising the in-phase component and quadrature component of each symbol after analog-to-digital conversion, to recover the original signal.

8. A coherent detection method, comprising:
performing, by a transmitting end, intensity modulation on an original signal to obtain an intensity-modulated optical signal, wherein the intensity-modulated optical signal excludes a phase-modulated optical signal; and
performing, by a receiving end, phase modulation on a local oscillator optical signal to obtain a phase-modulated local oscillator optical signal, mixing the phase-modulated local oscillator optical signal and the intensity-modulated optical signal transmitted by the transmitting end, and then performing photoelectric detection, analog-to-digital conversion, and digital signal receiving processing in sequence to recover the original signal;

wherein performing, by a receiving end, phase modulation on a local oscillator optical signal to obtain a phase-modulated local oscillator optical signal comprises:

performing phase modulation on the local oscillator optical signal in each symbol period to obtain a phase-modulated local oscillator optical signal, wherein a modulation frequency of the phase-modulated local oscillator optical signal is consistent with a symbol rate of the intensity-modulated optical signal; or performing phase modulation twice on the local oscillator optical signal in each symbol period to obtain in sequence two phase-modulated local oscillator optical signals with different phases, wherein a modulation frequency of each of the phase-modulated local oscillator optical signals is twice a symbol rate of the intensity-modulated optical signal.

9. A coherent detection apparatus, comprising:

a signal receiving module configured to receive an intensity-modulated optical signal transmitted by a transmitting end, wherein the intensity-modulated optical signal is obtained by intensity modulation performed by the transmitting end on an original signal, wherein the intensity-modulated optical signal excludes a phase-modulated optical signal;

a phase modulation module configured to perform phase modulation on a local oscillator optical signal to obtain a phase-modulated local oscillator optical signal; and a signal recovery module configured to mix the intensity-modulated optical signal and the phase-modulated local oscillator optical signal, and then perform photoelectric detection, analog-to-digital conversion, and digital signal receiving processing in sequence to recover the original signal;

wherein the phase modulation module comprises:

an adjustable electrical delay line configured to control phase modulation on the local oscillator optical signal;

a phase modulator configured to:

under the control of the adjustable electrical delay line, perform phase modulation on the local oscillator optical signal in each symbol period to obtain the phase-modulated local oscillator optical signal, wherein a modulation frequency of the phase-modulated local oscillator optical signal is consistent with a symbol rate of the intensity-modulated optical signal; or perform phase modulation twice on the local oscillator optical signal in each symbol period to obtain in sequence two phase-modulated local oscillator optical signals with different phases, wherein a modulation frequency of each of the phase-modulated local oscillator optical signals is twice a symbol rate of the intensity-modulated optical signal.

10. The apparatus of claim 9, wherein the signal receiving module comprises:

a polarization controller configured to adjust a polarization state of the intensity-modulated optical signal transmitted by the transmitting end, so that the polarization state of the intensity-modulated optical signal is consistent with a polarization state of the phase-modulated local oscillator optical signal.

11. The apparatus of claim 10, wherein the signal recovery module comprises:

an optical coupler configured to mix the intensity-modulated optical signal and the phase-modulated local oscillator optical signal with a consistent polarization state;

a balanced detector configured to perform photoelectric detection on a mixed optical signal to obtain an electrical signal comprising an in-phase component and a quadrature component of each symbol;

an analog-to-digital converter configured to perform analog-to-digital conversion on the electrical signal comprising the in-phase component and quadrature component of each symbol; and a digital signal receiver configured to perform decision demodulation on a digital signal comprising the in-phase component and quadrature component of each symbol after analog-to-digital conversion, to recover the original signal.

12. The apparatus of claim 11, wherein the digital signal receiver is configured to extract the in-phase component and quadrature component of each symbol; and perform modular decision on the in-phase component and quadrature component of each symbol to recover the original signal.

13. The apparatus of claim 12, wherein the digital signal receiver is further configured to perform orthogonalization on the extracted in-phase component and quadrature component of each symbol before modular decision is performed on the in-phase component and quadrature component of each symbol, so that the modular decision is performed on an in-phase component and a quadrature component of each symbol obtained after the orthogonalization.

14. The apparatus of claim 9, wherein the apparatus further comprises:

a first polarizing beam splitter configured to divide the phase-modulated local oscillator optical signal into two phase-modulated local oscillator optical signals with orthogonal polarization states; and accordingly, the signal receiving module comprises:

a second polarizing beam splitter configured to divide the intensity-modulated optical signal transmitted by the transmitting end into two intensity-modulated optical signals with orthogonal polarization states, so as to obtain two groups of intensity-modulated optical signals and phase-modulated local oscillator optical signals with consistent polarization states.

15. The apparatus of claim 14, wherein the signal recovery module comprises:

an optical coupler configured to mix the intensity-modulated optical signal and the phase-modulated local oscillator optical signal with a consistent polarization state;

a balanced detector configured to perform photoelectric detection on a mixed optical signal to obtain an electrical signal comprising an in-phase component and a quadrature component of each symbol;

an analog-to-digital converter configured to perform analog-to-digital conversion on the electrical signal comprising the in-phase component and quadrature component of each symbol; and a digital signal receiver configured to perform decision demodulation on a digital signal comprising the in-phase component and quadrature component of each symbol after analog-to-digital conversion, to recover the original signal.

16. A coherent detection system, comprising a transmitting end and a receiving end, wherein the transmitting end is configured to perform intensity modulation on an original signal to obtain an intensity-modulated optical signal; and
the receiving end comprises the coherent detection apparatus according to claim 9.

\* \* \* \* \*